United States Patent [19]
Porat

[11] 4,327,593
[45] May 4, 1982

[54] FORCE TRANSDUCER

[75] Inventor: Chaim Porat, Beer-Sheva, Israel

[73] Assignee: Beta Engineering & Development Ltd., Beer-Sheva, Israel

[21] Appl. No.: 148,485

[22] Filed: May 9, 1980

[30] Foreign Application Priority Data

Jul. 19, 1979 [IL] Israel ......................................... 57841

[51] Int. Cl.³ ................................................ G01L 1/16
[52] U.S. Cl. .................................. 73/862.68; 73/517 R
[58] Field of Search ........... 73/862.48, 862.62, 862.63, 73/862.64, 862.67, 862.68, 517 R

[56] References Cited

U.S. PATENT DOCUMENTS

| | | | |
|---|---|---|---|
| 2,338,732 | 1/1944 | Nosker | 73/517 R |
| 2,643,869 | 6/1953 | Clark | 73/497 |
| 3,283,590 | 11/1966 | Shang | 73/517 R |
| 3,712,109 | 1/1973 | Haken | 73/517 R |

Primary Examiner—Anthony V. Ciarlante
Attorney, Agent, or Firm—Benjamin J. Barish

[57] ABSTRACT

A force transducer device is described having temperature compensation and including two force transducer units mounted to a fixed support along a common axis by a first mounting member attachable to the fixed support and engaging one end of the two units, and a second mounting member engaging the other end of the units, the device further including force applying means for applying the external force along the common axis of the two units. Also described is an electrical circuit connecting the two force transducer units together such that force-generated signals are added to each other and temperature-generated signals are subtracted from each other, thereby compensating for any temperature variations.

12 Claims, 4 Drawing Figures

FORCE TRANSDUCER

BACKGROUND OF THE INVENTION

The present invention relates to force transducing devices, and particularly to devices mountable to a fixed support and adapted to produce an electrical signal in response to the application of a force to the device.

Such force tranducing devices are used in a number of applications, for example in load cells (e.g. of the resistance strain-gage type) which output an electrical signal in response to the amplitude of the force (i.e., the load) applied, or in rate-of-change systems, such as inertia-acceleration systems, in which the electrical output corresponds to the rate-of-change of the force amplitude, the latter systems commonly using piezoelectric crystals. One source of error in the known devices of either type is due to temperature-caused variations or signals in their outputs. This is because temperature changes not only vary the characteristics of the transducing element itself, but also vary the dimensions of its mounting to its respective support such as to introduce extraneous stresses, and therefore errors, in their electrical outputs. Many of the known devices do not provide temperature compensation, and in the known devices which do provide for it, the arrangements are usually quite complicated, bulky and expensive.

BRIEF SUMMARY OF THE INVENTION

An object of the present invention is to provide a novel force transducing device which may be of a simple and compact construction and which may be electrically connected in a convenient manner so as to provide for temperature compensation.

According to a broad aspect of the present invention, there is provided a force transducing device mountable to a fixed support and adapted to produce an electrical signal in response to the application of an external force to the device, characterized in that the device includes two force transducer units mounted to the fixed support along a common axis by first and second mounting members. The first mounting member comprises an arm interposed between and engaging the inner confronting ends of the two force transducer units at right angles to their common axis, and the second mounting member comprises an outer frame member enclosing the two force transducer units and engaging their outer ends. One of the mounting members is attachable to the fixed support, and the other mounting member includes force applying means in alignment with the common axis of the two force transducer units for applying the external force in a linear direction along that common axis.

Particularly good results have been obtained with the described embodiment of the invention, wherein the arm is attachable at one end to the fixed support, the opposite end of the arm being interposed between and engaging the inner confronting ends of the two force transducer units; whereas the outer frame member includes the force applying means in alignment with the common axis for applying the external force in a linear direction along the common axis, said first mounting member being attachable to the fixed support and engaging one end of each of the two force transducer units, said second mounting member engaging the other ends of the two force transducer units and including force applying means for applying the external force along said common axis.

A device constructed as above may be conveniently provided with temperature compensation by including an electrical circuit connecting the two force transducer units together such that force-generated signals are added to each other, and temperature-generated signals are subtracted from each other.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
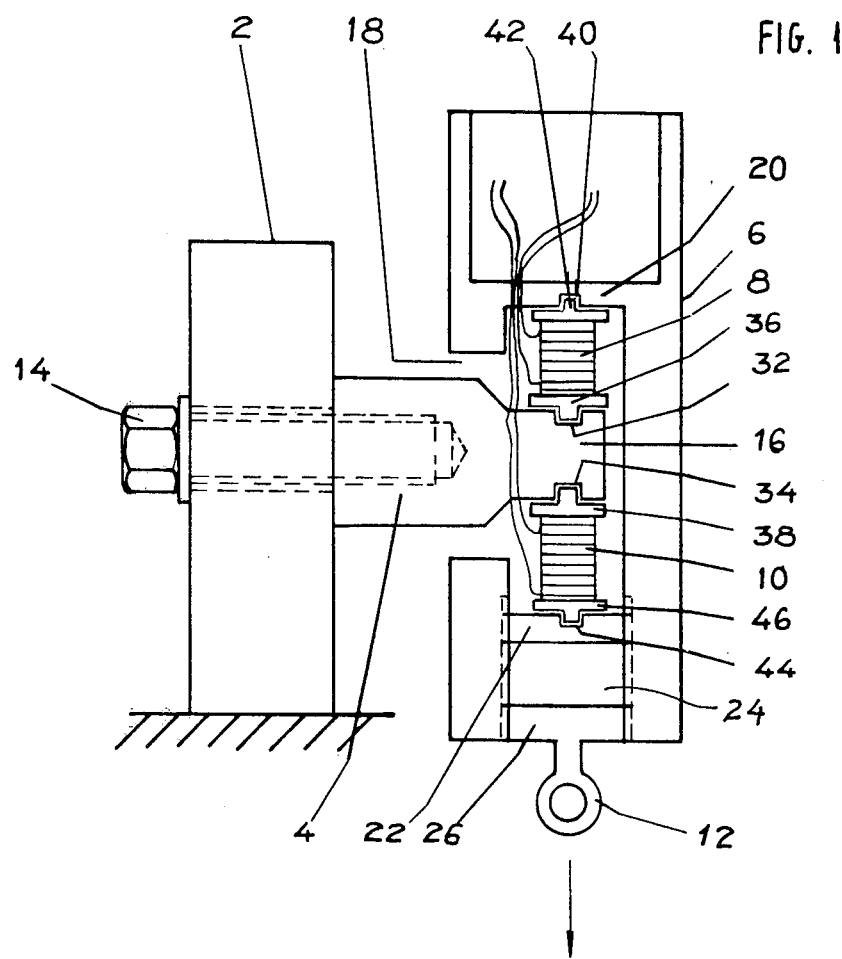
FIG. 1 illustrates, in longitudinal section, one form of force transducing device constructed in accordance with the invention.
Figure 2:
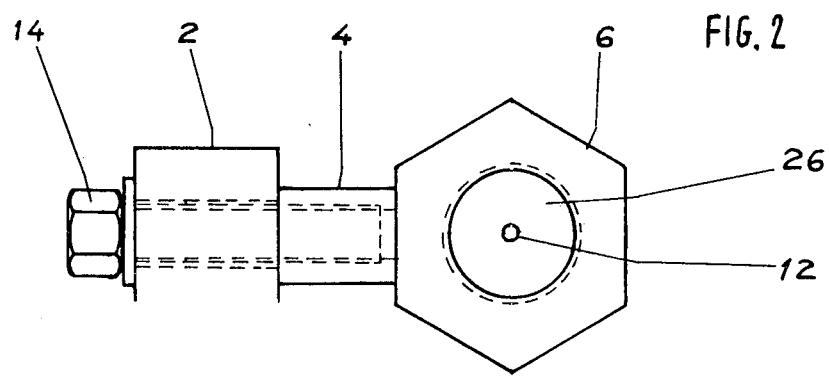
FIG. 2 is an end elevational view of the device of FIG. 1.

Briefly, the device illustrated in FIGS. 1 and 2 comprises a fixed support, generally designated 2, and two mounting members, 4 and 6, for mounting two forced transducer units, 8 and 10 along a common axis, which axis is coaxial to the external force to be measured, the latter being applied to the device by any suitable force-applying member, such as a hook 12. In the illustrated embodiment of the invention, the force transducer units 8 and 10 are of the piezoelectric crystal type which output an electrical voltage corresponding to the rate-of-change in amplitude of the force applied to it by hook 12. Thus, one application for the device illustrated in FIG. 1 would be in a system for measuring acceleration, wherein support 2 would be fixed to a moving body, and a weight would be suspended from hook 12, so that the force transducer units 8 and 10 would produce electrical outputs corresponding to the rate of change of velocity, namely to the rate of acceleration, of the moving body to which support 2 is fixed. It will be appreciated, however, that this is but one application of the force transducer device illustrated in the drawings, and that such devices could be used in many other applications, as will be apparent from the description below.

Arm 4 is mounted in cantilever fashion to support 2 by a bolt 14 passing through one end of the arm. The opposite, free end of mounting arm 4 is interposed between the two force transducer units 8 and 10 and engages the inner confronting ends of these units. The outer ends of the force transducer units 8 and 10 are engaged by the mounting frame member 6 which encloses and is supported by these units.

Mounting frame member 6 is of hexagonal cross-section, as shown in FIG. 2, and is formed with an opening 18 through which passes the free end 16 of the mounting arm 4. One force transducer unit 8 is interposed between one face of the free end 16 of the arm, and a wall 20 integrally formed with the mounting frame 6. The other force transducer unit 10 is interposed between the opposite face of arm end 16 and disc 22 threadedly received in a cylindrical bore 24 formed in the mounting frame 6. The outer end of bore 24 threadedly receives another circular disc 26 having the force-applying hook 12 attached thereto.

The arrangement is such that the two force transducer units 8 and 10 are mounted precisely on a common axis which is also coaxial to the axis of hook 12, so that the external force applied by the hook is transmitted precisely axially of the two force transducer units. To facilitate this coaxial alignment, the outer end 16 of the mounting arm 4 is formed on its oppsite faces with locating recesses 32, 34, adapted to receive projections 36, 38, in the respective ends of the force transducer units 8 and 10. Wall 20 of the mounting frame 6 is similarly formed with a central locating recess 40 adapted to receive a projection 42 in the opposite end of the force transducer unit 8; and disc 22 is likewise formed with a central locating recess 44 adapted to receive a projection 46 in the opposite end of force transducer unit 10.

As mentioned above, the two force transducer units 8 and 10 are of the piezoelectric crystal type and generate electrical charges corresponding to the rate-of-change in the amplitude of the external force applied (via hook 12). Both of the units 8 and 10 are of the same construction, which construction is more particularly illustrated in FIG. 3 with respect to unit 8.

Figure 3:
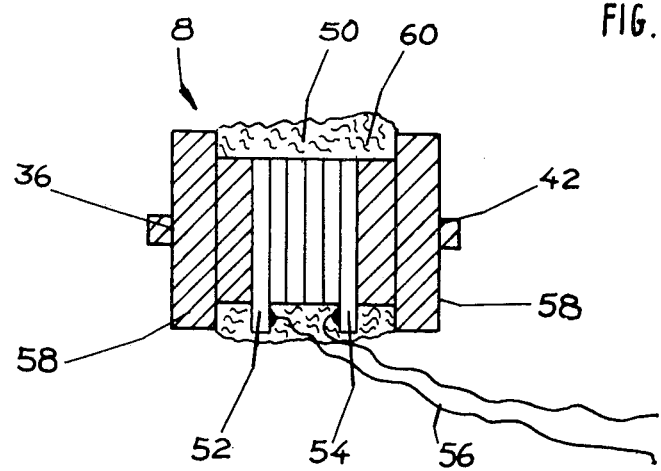
FIG. 3 is an enlarged fragmentary view illustrating the construction of each of the two force transducer units included in the device of FIG. 1.

Thus, as shown in FIG. 3, force transducer unit 8 includes a plurality (four being illustrated in FIG. 3) of piezoelectric crystal discs 50 sandwiched between a pair of conductive discs 52, 54. The latter discs may be of insulating material having a conductive coating on their inner faces in contact with the outer faces of the end piezoelectric crystals 50. Electrical conductors 56 are electrically connected, as by soldering, to the conductive faces of discs 52, 54, to provide the electrical connections from the piezoelectric crystals. End caps 58 are applied to the outer faces of the conductive discs 52, 54, and all the discs of the transducer unit are potted in insulating material 60 to provide a unitary transducer unit. The end caps 58 are formed with the locating projections 36, 42 receivable within the locating recesses 32, 42 in the mounting arm 4 and mounting frame 6, are described earlier.

Figure 4:
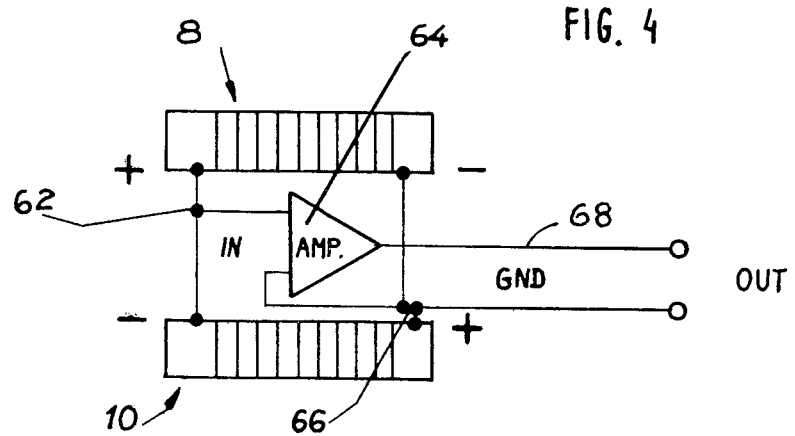
FIG. 4 illustrates an electrical circuit including the electrical connections that may be applied to the two transducer units in the device of FIG. 1 to provide for temperature compensation.

The two force transducer units 8 and 10 are electrically connected, via the conductors 56, in the electrical circuit such that force-generated signals in their outputs will be added to each other, whereas temperature-generated signals in their outputs will be subtracted from each other, and will therefore be substantially self-cancelling. FIG. 4 illustrates one arrangement that can be used. Thus, as shown in FIG. 4, the "+" terminal of unit 8 is connected to the "−" terminal of unit 10, and the juncture 62 is connected to one input terminal of an amplifier 64. The "−" terminal of unit 8 is connected to the "+" terminal of unit 10, the juncture 66 being connected to ground. The output from amplifier 64 is taken from its output terminal 68 and ground.

The manner of using the force transducing device illustrated in FIG. 1 will be apparent from the above description. Thus, arm 4 is first mounted to the support 2 by means of bolt 14, and then the mounting frame 6 is applied to the opposite end of the arm with one force transducer unit 8 interposed between one face of end 16 of arm 4 and wall 20 of the mounting frame; the unit is centered by inserting projections 36 and 40 of its end caps into the locating recesses 32 and 42 in the mounting arm 4 and mounting frame 6. The other force transducer unit 10 is then inserted to engage the opposite face of arm end 16, and disc 22 is threaded into bore 24 in the mounting frame 6 until it securely engages the respective end of the force transducer unit 10, with its end projection 46 received with the central recess 44 in the disc 22.

Disc 22 may then be threaded further into bore 24 of the mounting frame 26 to apply a predetermined stress to both of the force transducer units 8 and 10. For example, in applications wherein the force to be applied to the described device may vary within the range of 1–5 Kgm, the predetermined stress applied by disc 22 may preferably be about 30 Kgm.

Disc 20, having the force-applying hook 12, is threaded into the outer end of bore 24 of the mounting frame 6. The interior of frame 6 may then be filled with an insulating potting material introduced via opening 18.

It will thus be seen that since the force-applying hook 12 is precisely coaxial to the mounting frame 6 and the two force transducer units 8 and 10, the external force applied by hook 12 will be precisely coaxially to the two force transducer units. It will also be seen that force-generated signals will be substantially the same for both of the force transducer units and will be added, whereas the temperature-generated signals, also the same for both units, will be subtracted and will therefore be substantially self-cancelling when these units are electrically connected in the circuit illustrated in FIG. 4.

In the illustrated example, the transducer units 8 and 10 are piezoelectric crystals which produce an output voltage, of the polarity of the "+" and "−" markings, with a change in stress. That is, if both units are prestressed, e.g., to 30 Kgm, they will produce no output (after the initial application of the prestressing force) until the stress is changed, at which time they will produce an output corresponding to the rate-of-change of the stress. Thus, if both units are prestressed to 30 Kgm, and a force is applied (via hook 12) of 5 Kgm, the stress on unit 8 will increase to 35 Kgm, causing the "+" terminal of unit 8 to go positive corresponding to the rate of application of 35 Kgm; whereas the "+" terminal of unit 10 will go negative, and thereby the "−" terminal of unit 10 will go positive, corresponding to the rate of application of 25 Kgm. The change in voltages corresponding to the change in the rate of application of the force to the two units 8 and 10 will thus be added, at juncture 62, before inputted into the amplifier 64.

On the other hand, if the temperature increases, this will tend to increase the stress on both units equally, so that the "+" terminal of unit 8 will become more positive, whereas the "−" terminal of unit 10 will become more negative. Thus, the changes in their outputs caused by temperature variations will be subtracted from each other, and thereby self-cancelling, at juncture 62 before being inputted into amplifier 64.

While the invention has been described with respect to one preferred embodiment, it will be appreciated that many other variations and applications may be made. For example, the two force transducer units 8 and 10 may be of the resistance strain-gage type (e.g. conductive particles compacted by the applied force), producing an electrical output corresponding to the amplitude of the force applied to the units, rather than to the rate-of-change of amplitude as described above using piezoelectric crystals. Such devices could be used, for example, as load cells, for measuring the load or other force applied via hook 12 or other force-applying member.

Many other variations, modifications, and applications of the invention will be apparent.

What is claimed is:

1. A force transducing device mountable to a fixed support and adapted to produce an electrical signal in response to the application of an external force to the device, characterized in that the device includes two force transducer units mounted to the fixed support along a common axis by first and second mounting members, said first mounting member comprising an arm interposed between and engaging the inner confronting ends of the two force transducer units, said second mounting member comprising an outer frame member enclosing the two force transducer units and engaging their outer ends; one of said mounting members being attachable to the fixed support, and the other of said mounting members including force applying means in alignment with said common axis for applying the external force in a linear direction along said common axis.

2. A device according to claim 1, further including an electrical circuit connecting the two force transducer units together such that force-generated signals are added to each other, and temperature-generated signals are subtracted from each other.

3. A device according to claim 1, wherein said mounting arm is attachable at one end to the fixed support, the opposite end of the arm being interposed between and engaging the inner confronting ends of the two force transducer units at right angles to said common axis; and wherein said outer frame member includes said force applying means in alignment with said common axis for applying the external force in a linear direction along said common axis.

4. A device according to claim 3, wherein said outer frame member further includes an adjustable element which engages the outer end of one of said force transducer units and is adjustable towards and away from the other force transducer unit for applying a predetermined pre-stress to the two units.

5. A device according to claim 4, wherein said adjustable element comprises a disc threaded into a cylindrical bore formed in one end of the outer frame member coaxially with the two force transducer units.

6. A device according to claim 5, wherein said force applying means comprises a second disc also threaded into said cylindrical bore of the frame member externally of said adjusting member, and having means at its center for coupling the force thereto.

7. A device according to claim 1, wherein both said mounting members include locating means cooperable with said force transducer units for locating same precisely coaxially to each other and to the force applying means.

8. A device according to claim 7, wherein said locating means comprises recesses formed centrally in the faces of both said mounting members engaging the outer faces of both of the force transducer units, and projections formed centrally in the respective faces of the force transducer units and receivable in said recesses.

9. A device according to claim 1, wherein each of said force transducer units comprises a piezoelectric crystal assembly.

10. A device according to claim 9, wherein each of said piezoelectric crystal assemblies comprises a plurality of piezoelectric crystal discs sandwiched between a pair of conductive discs containing the electrical connections to the respective assembly.

11. A device according to claim 10, wherein each of said piezoelectric crystal assemblies further comprises outer insulating discs.

12. A device according to claim 10, wherein all the discs of each of the piezoelectric crystal assemblies are potted in insulating material.

* * * * *